United States Patent
Maghrabi et al.

(10) Patent No.: US 12,531,902 B2
(45) Date of Patent: Jan. 20, 2026

(54) SYSTEM, DEVICE AND METHOD FOR PROTECTING USERS AGAINST PHISHING EMAIL ATTACKS

(71) Applicant: SAUDI ARABIAN OIL COMPANY, Dhahran (SA)

(72) Inventors: Tariq O. Maghrabi, Dammam (SA); Dalia A. Albuqaytah, Dammam (SA); Ola M. Alshamrani, Yanbu (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 64 days.

(21) Appl. No.: 18/676,092

(22) Filed: May 28, 2024

(65) Prior Publication Data
US 2025/0373657 A1    Dec. 4, 2025

(51) Int. Cl.
H04L 9/40 (2022.01)
(52) U.S. Cl.
CPC .............................. H04L 63/1483 (2013.01)
(58) Field of Classification Search
CPC ................................................ H04L 63/1483
See application file for complete search history.

(56) References Cited

U.S. PATENT DOCUMENTS

| | | | | |
|---|---|---|---|---|
| 8,291,065 B2 * | 10/2012 | Goodman | ........... | H04L 63/1483 709/224 |
| 8,839,369 B1 * | 9/2014 | Dai | ....................... | G06F 21/552 726/4 |
| 9,787,714 B2 * | 10/2017 | Bach | ................... | H04L 63/1483 |
| 10,404,745 B2 * | 9/2019 | Verma | ..................... | G06N 20/20 |
| 10,601,848 B1 * | 3/2020 | Jeyaraman | .......... | H04L 63/1416 |
| 11,295,010 B2 * | 4/2022 | Lowry | ................ | G06F 11/3409 |
| 11,500,984 B2 * | 11/2022 | Kras | ................... | H04L 63/0227 |
| 2007/0039038 A1 * | 2/2007 | Goodman | ........... | H04L 63/1483 726/2 |
| 2011/0055922 A1 * | 3/2011 | Cohen | ................. | G06F 21/6263 726/22 |

(Continued)

FOREIGN PATENT DOCUMENTS

| | | |
|---|---|---|
| CN | 113489734 A | 10/2021 |
| WO | 2023/053101 A1 | 4/2023 |

OTHER PUBLICATIONS

Cooper, Molly et al., "Subject matter experts' feedback on a prototype development of an audio, visual, and haptic phishing email alert system"; Online Journal of Applied Knowledge Management; vol. 8, Issue 2; pp. 107-121; 2020 (15 pages).

Primary Examiner — J. Brant Murphy
(74) Attorney, Agent, or Firm — Osha Bergman Watanabe & Burton LLP

(57) ABSTRACT

A method to protect an email user against a phishing attack is described. The method includes detecting a mouse click or a mouse hovering, from a computer mouse of the email user, of an email item on a computer desktop, determining, based on a threat intelligence data source, that the email item is associated with the phishing attack, sending, in response to said determining, a phishing indicator detection signal to a signaling mechanism attached to the computer mouse, and generating, by the signaling mechanism in response to the phishing indicator detection signal, an alert signal to the email user, wherein the email user performs a mitigation action in response to the alert signal.

20 Claims, 5 Drawing Sheets

(56) References Cited

U.S. PATENT DOCUMENTS

| | | | |
|---|---|---|---|
| 2013/0012788 A1* | 1/2013 | Horseman | G16H 50/30 |
| | | | 600/301 |
| 2013/0012790 A1* | 1/2013 | Horseman | A61B 5/6891 |
| | | | 600/301 |
| 2013/0013327 A1* | 1/2013 | Horseman | A61B 5/386 |
| | | | 600/301 |
| 2017/0048273 A1* | 2/2017 | Bach | H04L 51/212 |
| 2020/0036751 A1* | 1/2020 | Kohavi | H04L 63/1416 |
| 2020/0250303 A1* | 8/2020 | Lowry | G06F 11/3409 |
| 2021/0075826 A1* | 3/2021 | Johnson | H04L 67/02 |
| 2021/0152596 A1* | 5/2021 | Hemingway | H04L 63/1483 |
| 2021/0248229 A1* | 8/2021 | Kras | H04L 51/08 |
| 2023/0008987 A1* | 1/2023 | Kras | H04L 63/1416 |
| 2024/0403413 A1* | 12/2024 | Cohen | G06F 21/53 |

\* cited by examiner

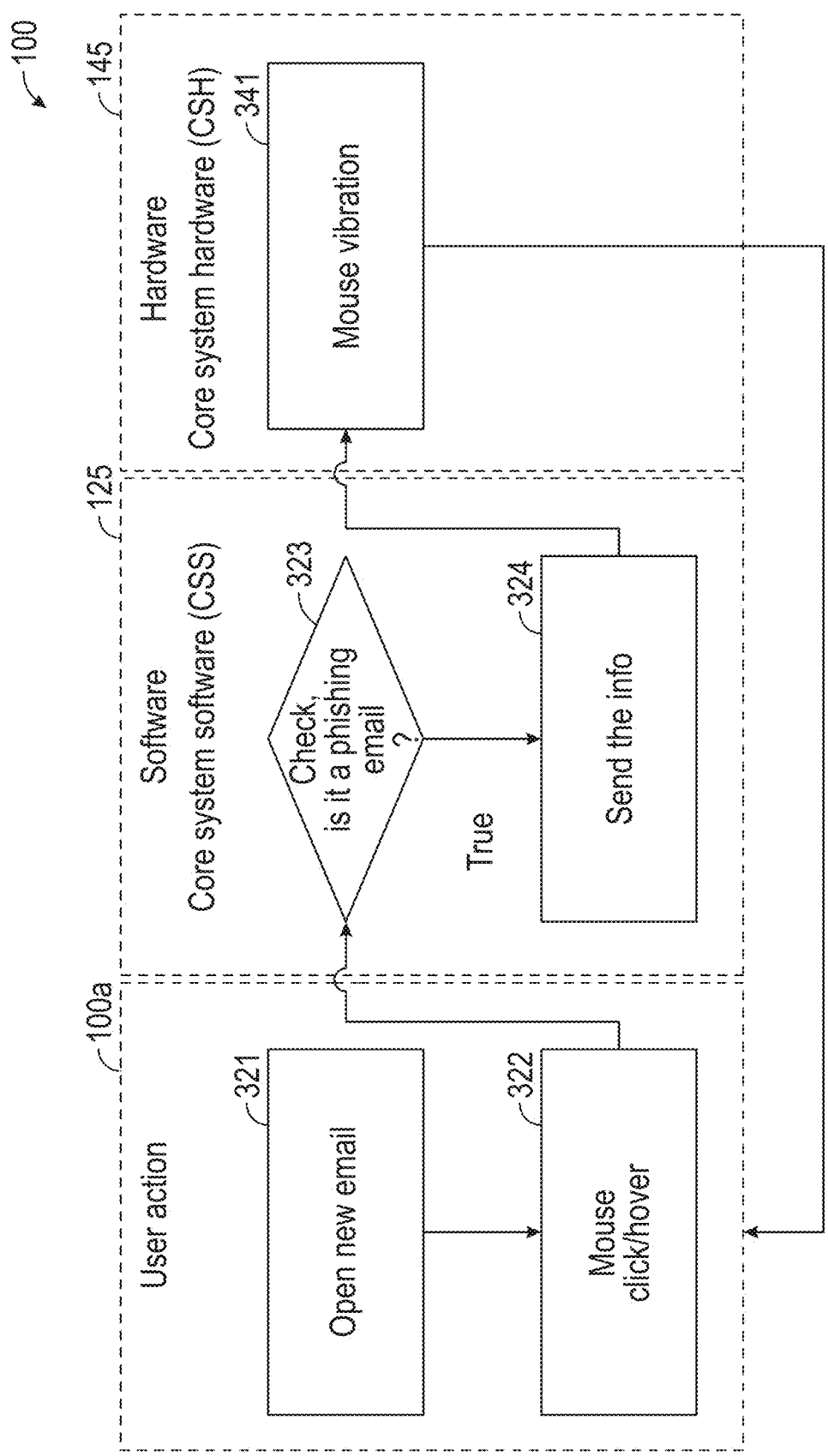
FIG. 3.1

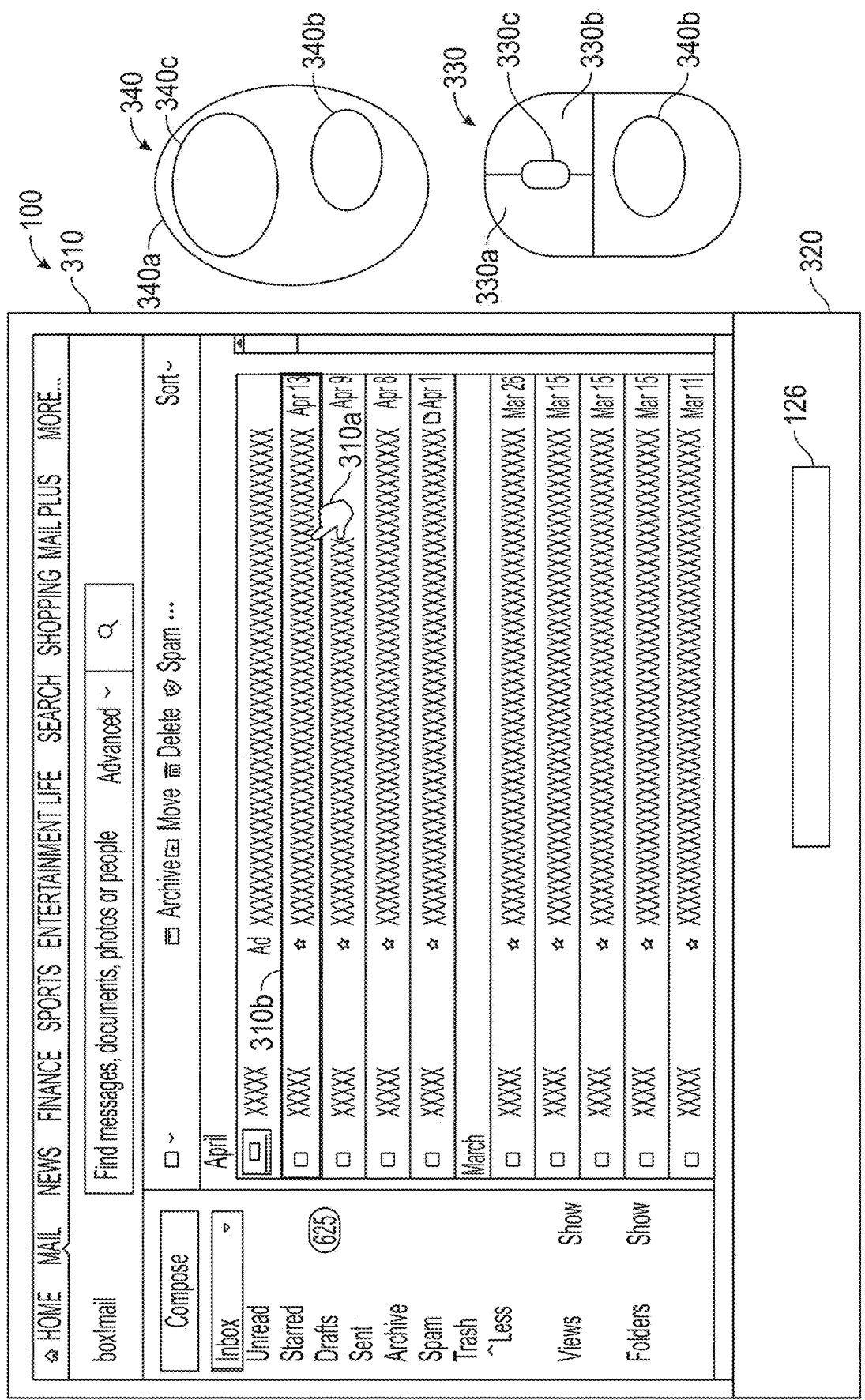
FIG. 3.2

SYSTEM, DEVICE AND METHOD FOR PROTECTING USERS AGAINST PHISHING EMAIL ATTACKS

BACKGROUND

Enterprise network security represents a significant investment required by corporations attempting to defend their computer networks from outside attacks. Unauthorized and malicious access by malevolent actors can come in many forms. Firewalls may be breached in order to either steal valuable information, or insert malicious code or programs intended to corrupt data or surreptitiously monitor activity. Physical security may also be breached by individuals attempting to secure direct access to a computer network. One area of particular concern is the infiltration of hackers via a corporate electronic mail (email) system. Because of the fact that end-users are frequently not fully trained about malicious attacks, they may be easily tricked or duped into opening virus-laden attachments or innocently following URL links that ultimately lead to the downloading and execution of malicious code. This particular attack is known as email phishing. More specifically, "phishing" refers to the fraudulent practice of sending emails or other messages purporting to be from reputable sources in order to induce individual recipients to reveal sensitive data, such as personal information, passwords, and credit card numbers.

SUMMARY

In general, in one aspect, the invention relates to a method to protect an email user against a phishing attack, comprising detecting a mouse click or a mouse hovering, from a computer mouse of the email user, of an email item on a computer desktop, determining, based on a threat intelligence data source, that the email item is associated with the phishing attack, sending, in response to said determining, a phishing indicator detection signal to a signaling mechanism attached to the computer mouse, and generating, by the signaling mechanism in response to the phishing indicator detection signal, an alert signal to the email user, wherein the email user performs a mitigation action in response to the alert signal.

In general, in one aspect, the invention relates to an anti-phishing mouse to protect an email user against a phishing attack, comprising a pointing mechanism that performs a mouse click or a mouse hovering, by the email user, of an email item on a computer desktop, wherein the email item is determined, by an anti-phishing software based on a threat intelligence data source, as being associated with the phishing attack, and a signaling mechanism coupled to the pointing mechanism, wherein the signaling mechanism receives, from the anti-phishing software in response to said determining, a phishing indicator detection signal, and generates, in response to the phishing indicator detection signal, an alert signal to the email user, and wherein the email user performs a mitigation action in response to the alert signal.

In general, in one aspect, the invention relates to an anti-phishing system to protect an email user against a phishing attack, comprising an anti-phishing mouse comprising a pointing mechanism that performs a mouse click or a mouse hovering, by the email user, of an email item on a computer desktop, and a signaling mechanism coupled to the pointing mechanism, and an anti-phishing software that determines, based on a threat intelligence data source, that the email item is associated with the phishing attack, and sends, in response to said determining, a phishing indicator detection signal to the signaling mechanism of the anti-phishing mouse, wherein the signaling mechanism generates, in response to the phishing indicator detection signal, an alert signal to the email user, and wherein the email user performs a mitigation action in response to the alert signal.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 3.1-3.2 show an example in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of this disclosure provide a system, device and method to protect computer users against phishing email attacks based on detecting phishing indicators and integrating with threat intelligence databases and feeds. In one or more embodiments of the invention, a device is provided that attaches to a computer mouse and includes a signaling mechanism, such as an electromechanical vibrator and/or buzzer. When one or more phishing indicators is detected based on the threat intelligence databases and feeds, the signaling mechanism within the device is activated to produce a mechanical vibration and/or an audible signal to alert the user.

Figure 1:
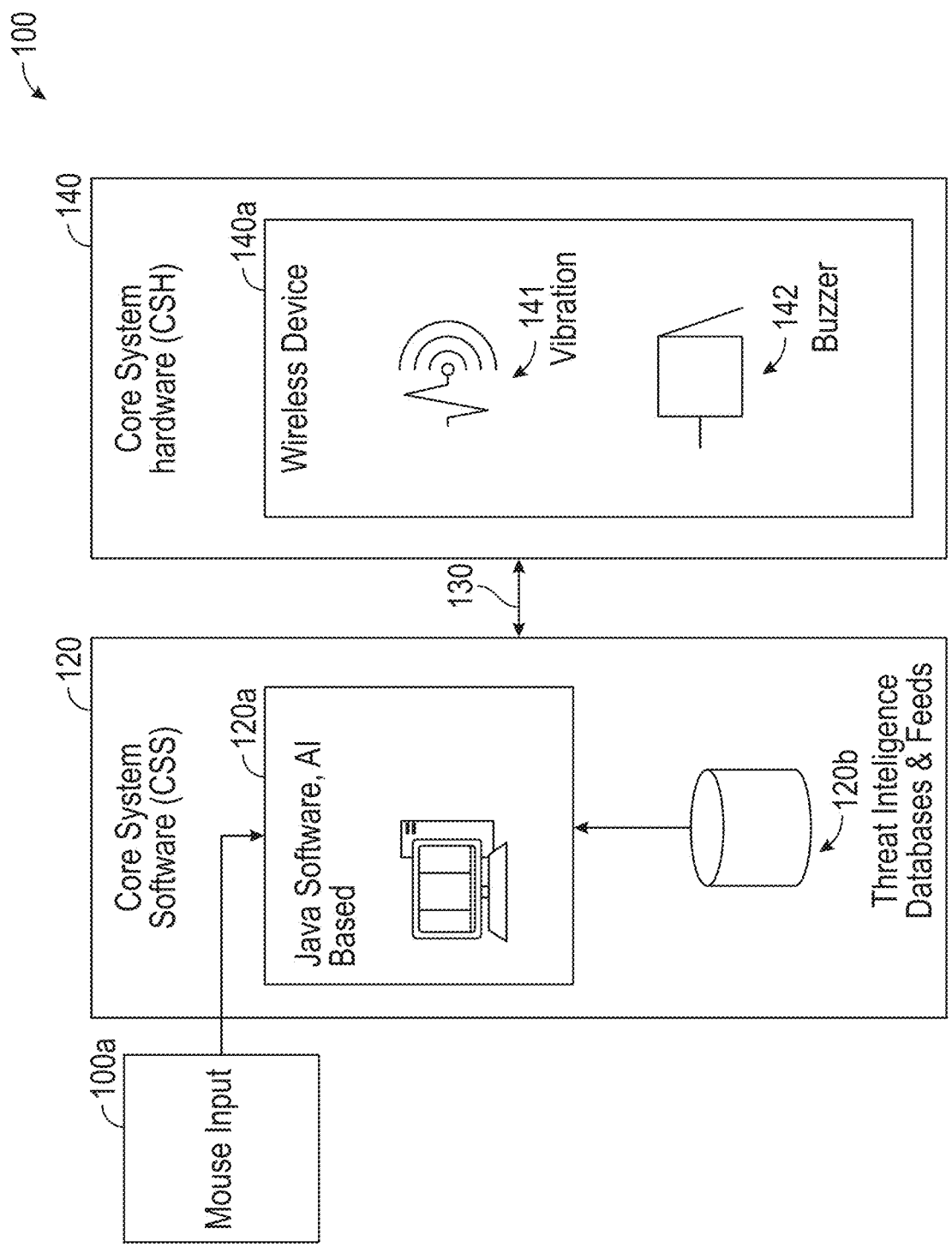
FIG. 1 shows a system in accordance with one or more embodiments.

FIG. 1 shows a schematic diagram in accordance with one or more embodiments. In one or more embodiments, one or more of the modules and/or elements shown in FIG. 1 may be omitted, repeated, combined and/or substituted. Accordingly, embodiments disclosed herein should not be considered limited to the specific arrangements of modules and/or elements shown in FIG. 1.

As shown in FIG. 1, an anti-phishing system (100) includes a Core System Software (CSS) (120) and a Core System Hardware (CSH) (140). Additional auxiliary components for miscellaneous support functions are not explicitly shown. The CSS (120) is configured to generate a phishing indicator detection signal (130) in response to a mouse input (100*a*) from a user. The mouse input (100*a*) corresponds to a digital signal generated by a computer mouse of the user as an input to the CSS (120). In this regard, the mouse input (100*a*) is also referred to as a user action (100*a*). In one or more embodiments, the CSS (120) is a Microsoft Windows Service to perform background tasks or execute long-running processes in the Microsoft Windows environment. The Microsoft Windows environment is the onscreen work area provided by the Windows Operating System, which is analogous to a physical desktop for the user. The mouse input (100*a*) is a digital signal generated by a computer mouse used by the user to navigate the Microsoft Windows environment. In one or more embodiments, the CSS (120) may include an Artificial Intelligence (AI)-based Java software (120*a*) using Natural Language Processing (NLP) based on Java programming or other programming languages. In particular, NLP enables AI-based Java software (120*a*) to read and understand the content of an email. With this understanding, the AI-based Java software (120*a*) can identify warning signs of phishing indicator, such as an attempt to create a sense of urgency, or drive the recipient user to click on a link or open an attachment. Specifically, NLP transforms text by using text vectorization, into data that a machine can understand. Machine learning algorithms are then fed training data and expected outputs (tags) to train machines (i.e., computer) to make associations between a particular input and its corresponding output. Machines then use statistical analysis methods to build their own "knowledge bank" and discern which features best represent the texts, before making predictions for unseen data (new texts). Ultimately, the more data these NLP algorithms are fed, the more accurate the text analysis models can be.

Moreover, the CSS (120) may be integrated with a security data source (120*b*), referred to as the threat intelligence databases and feeds. In particular, the threat intelligence databases and feeds are a stream of data about potential attacks (known as "threat intelligence") from an external source. SlashNext.com and zvelo.com are examples of Real-Time Phishing Threat Intelligence that could be integrated with the CSS (120). CSS (120) uses the threat intelligence databases and feeds to keep their phishing security defenses updated and ready to detect the latest phishing attacks. Integrating with multiple threat intelligence sources gives CSS (120) information about current or potential phishing attacks and helps CSS (120) to correlate phishing indicators of compromise from threat intelligence databases and feeds. An example of the CSS (120) is described in reference to FIG. 3.2 below.

The CSS (120), as a Microsoft Windows service, is automatically started when the computer boots to establish the Microsoft Windows environment. The CSS (120) does not provide specific user interface and is paused or restarted based on absence or presence, respectively, of the mouse input (100*a*). In one or more embodiments, the mouse input (100*a*) is a digital signal transmitting input data to the anti-phishing system (100) that is generated by a computer mouse and represents a mouse cursor location over an email user interface displayed in the Microsoft Windows environment. The user is referred to as an email user in this context. Once the mouse is clicked or hovered over a particular email item displayed by the email user interface, the AI-based Java software (120*a*) identifies the email item based on the mouse cursor location and analyzes the identified email item using NLP to retrieve or generate a phishing indicator of the particular email item based on the security data source (120*b*). The particular email item may be an entry in a displayed email list or a segment of email content in an opened email. If the phishing indicator of the particular email item indicates that a phishing attack is detected, the CSS (120) generates a phishing indicator detection signal (130) and then sends it to the CSH (140) as shown in FIG. 1. Throughout this disclosure, the term "phishing attack" may refer to a potential phishing attack, an attempted phishing attack, or a phishing attack in progress. For example, the phishing indicator detection signal (130) may be a digital signal transmitted using a wired or wireless communication link to the CSH (140). The phishing indicator detection signal (130) may be a one-shot signal indicating each time the mouse is clicked on the particular email item, or a level signal persisting throughout the duration when the mouse is hovered over the particular email item.

In one or more embodiments, the CSH (140) is configured to activate a signaling mechanism (140*a*) in response to the phishing indicator detection signal (130). In one or more embodiments, the signaling mechanism (140*a*) includes one or more of an electromechanical vibrator (141) and a buzzer (142). Once activated, the signaling mechanism (140*a*) produces a mechanical vibration by the electromechanical vibrator (141) and/or an audible signal by the buzzer (142) to alert the email user regarding a phishing attack associated with the mouse input (100*a*) of the email user. For example, the mechanical vibration and the audible signal may persist for a pre-determined duration (e.g., 100 milli-second, 1 second, etc.) each time the signaling mechanism (140*a*) is activated in response to the phishing indicator detection signal (130), e.g., as a one-shot signal. In another example, the mechanical vibration and the audible signal may persist for the entire duration of the phishing indicator detection signal (130), e.g., as a level signal, that activates the signaling mechanism (140*a*).

In one or more embodiments, the CSH (140) is a small wireless device that can be attached to the exterior or interior of the computer mouse of the email user. Alternatively, the CSH (140) may also be integrated in the computer mouse as a built-in component. An example of the CSH (140) is described in reference to FIG. 3.2 below.

In one or more embodiments, the anti-phishing system (100) performs the functionalities described above using the method described in reference to FIG. 2 below. In some embodiments, the anti-phishing system (100) includes a computer system, such as a portion of the computing system described in reference to FIG. 4 below. Although the description of the anti-phishing system (100) above relates to the Microsoft Windows Environment, it is contemplated that the anti-phishing system (100) may also be applicable to other operating system environments, such as the MacOS, IOS, Android, etc.

Figure 2:
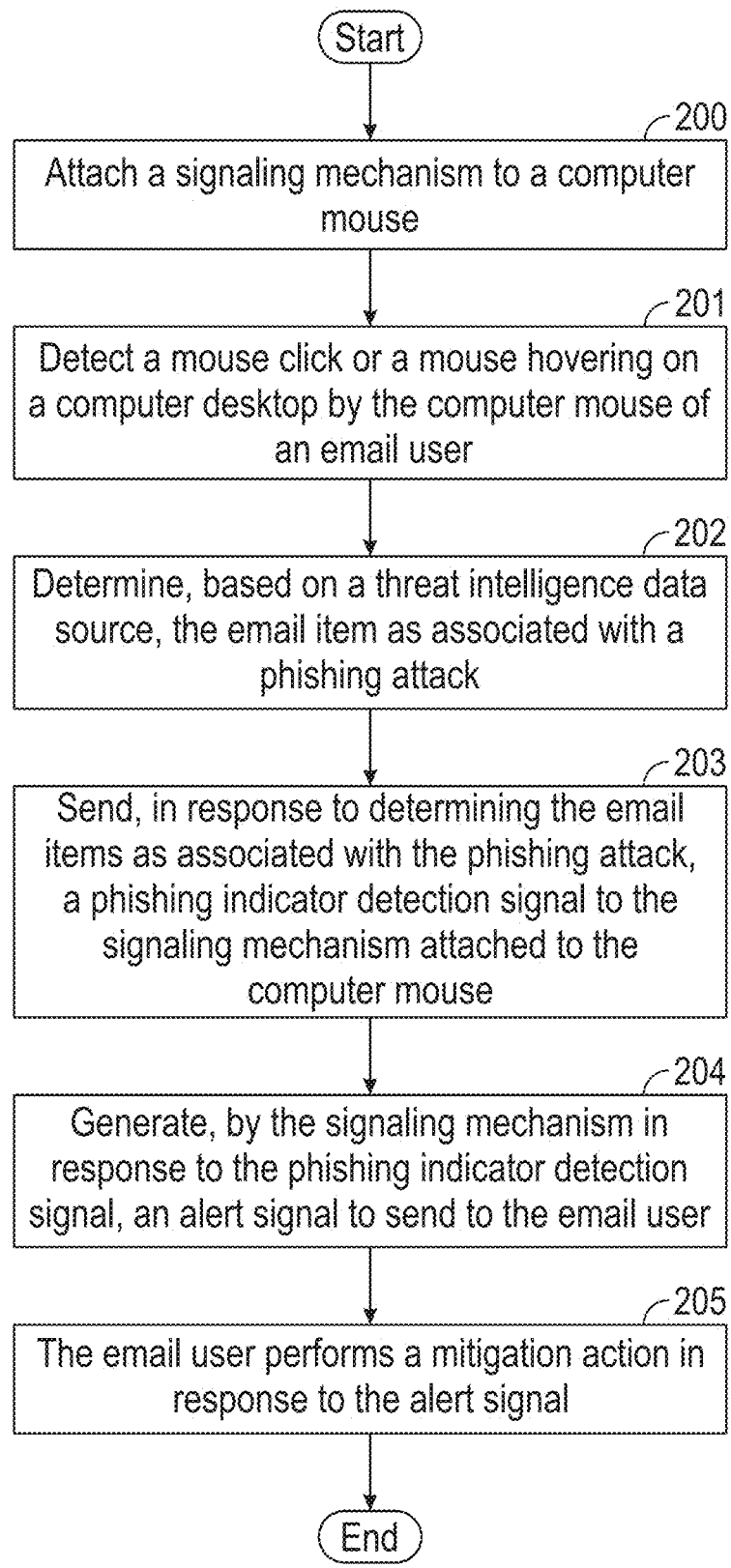
FIG. 2 shows a flowchart in accordance with one or more embodiments.

Turning to FIG. 2, FIG. 2 shows a process flowchart in accordance with one or more embodiments. FIG. 2 may be performed using one or more components as described in FIG. 1. While the various blocks in FIG. 2 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

Initially in Block 200, a signaling mechanism is attached to a computer mouse, making the mouse an Anti-Phishing Mouse. In one or more embodiments, the signaling mechanism is attached by an email user to retrofit the computer mouse adding the anti-phishing functionality. In one or more embodiments, the signaling mechanism is integrated within the computer mouse during factory assembly without intervention by the email user.

In Block 201, a mouse click or a mouse hovering on a computer desktop is detected by the computer mouse of the email user. In one or more embodiments, the computer desktop executes Microsoft Windows environment. In particular, the computer mouse sends a wired or wireless digital signal identifying the mouse click or mouse hovering to the Microsoft Windows environment. The Windows Operating System and installed driver software collectively identify the mouse click or mouse hovering as specific to an email item on the computer desktop.

In Block 202, the email item is determined, based on a threat intelligence data source and feeds, as associated with the phishing attack. In one or more embodiments, the determination is performed by a Microsoft Windows service analyzing the email item in the background. The determination in Block 202 may also be based on common indicators of phishing emails.

In Block 203, in response to determining the email item as associated with the phishing attack, a phishing indicator detection signal is sent to the signaling mechanism attached to the computer mouse. In one or more embodiments, the phishing indicator detection signal is sent by the Microsoft Windows service.

In Block 204, in response to the phishing indicator detection signal, the signaling mechanism generates an alert signal to send to the email user. In one or more embodiments, the alert signal is a mechanical vibration generated by an electromechanical vibrator in the signaling mechanism as activated by the phishing indicator detection signal. In one or more embodiments, the alert signal is an audible sound signal generated by a buzzer in the signaling mechanism as activated by the phishing indicator detection signal. Said another way, upon detection of one or more phishing indicator(s), a vibration feature with buzzer within the augmented mouse device is activated/turned on.

In Block 205, the email user performs a mitigation action in response to the alert signal. For example, the mitigation action may include closing the new email or reporting the email phishing attack by forwarding the opened email to a system administrator or fraud department that manages security of the email application. The email user may also take other actions such as blocking the new email, deleting the new email, or any other suitable action to avoid any problems that may be caused by the phishing attack.

FIGS. 3.1 and 3.2 show an example in accordance with one or more embodiments. The example shown in FIGS. 3.1 and 3.2 is based on the system and method described in reference to FIGS. 1 and 2 above. In one or more embodiments, one or more of the modules and/or elements shown in FIGS. 3.1 and 3.2 may be omitted, repeated, combined and/or substituted. Accordingly, embodiments disclosed herein should not be considered limited to the specific arrangements of modules and/or elements shown in FIGS. 3.1 and 3.2.

FIG. 3.1 shows an example of the anti-phishing system (100) that alerts the user of a potential phishing email attack. Cyber criminals use phishing emails because it is easy, cheap and effective. Email addresses are easy to obtain, and emails are virtually free to send. With little effort and cost, attackers can quickly gain access to valuable data. The user who falls for phishing scams may end up with malware infections (including ransomware), identity theft and data loss. Cyber criminals also use phishing attacks to steal financial account data, credit card numbers and medical records as well as sensitive business data, such as customer names and contact information.

As shown in FIG. 3.1, the user action (100*a*) is analyzed using the software (125) to detect a phishing attack and generate a phishing indicator detection signal. The user action (100*a*) includes the user opening a new email (321) in the Microsoft Windows Environment and using a computer mouse to click on or hover over (322) an email item. For example, the software (125) may be an example of the CSS (120) depicted in FIG. 1. The email item may be an email address of the sender, the subject of the email, a link inserted in the email content, or other data object embedded in the email. The mouse click/hover (322) causes a digital signal to be transmitted wirelessly from the computer mouse to the software (125) that identifies the email item that is clicked or hovered over by the user using the computer mouse. The software (125) checks the identified email item against a threat intelligence database or feed to make a determination (323) whether the email item is associated with any phishing attack. If it is determined that the email item is associated with a phishing attack, the software (125) sends the phishing indicator detection signal (324) to the hardware (145) to activate an electromechanical vibrator and generate a mouse vibration (341). For example, the hardware (145) may be an example of the CSH (140) depicted in FIG. 1 where the electromechanical vibrator is attached to a housing of the computer mouse held by the user's hand. Upon being activated, the electromechanical vibrator's vibration is mechanically transmitted to the user's hand via the computer mouse housing. As alerted by the vibration, the user may then discontinue any further action to the opened new email (321) to minimize any risk of the email phishing attack. For example, the user may perform a mitigation action, such as closing the opened new email (321) or reporting the email phishing attack by forwarding the opened new email (321) to a system administrator or fraud department that manages security of the email application.

FIG. 3.2 shows another example of the anti-phishing system (100) that alerts the user of a phishing email attack. As noted above, phishing email attacks are one of the most common security challenges faced by individuals and organizations. A useful defensive measure against this threat is an anti-phishing mouse that helps protecting the computer users against phishing email attacks and improves the Phishing KPIs (key performance indicators), such as Phishing Resilience, Negative Behavior and Repeated Violations, etc. For example, Phishing Resilience is measured by assessing the average rate of users reporting phishing emails they receive, divided by the average end-user failure due to email phishing attacks. Negative Behavior and Repeated Violations are different phishing behaviors, e.g., listed as follows:

1. Negative Behavior: defined as clicking on the link or downloading the attachment in the phishing email regardless of reporting the email to SPAM. Basically, those that failed to spot the phishing indicators are accounted as ones that fell into violation. Repeated Violation is defined as those that failed to spot the phishing indicators more than once in a year.
2. Positive Behavior: defined as reporting the phishing email to SPAM without clicking the link or downloading the attachment.
3. Neutral Behavior: defined as not clicking on the link or downloading the attachment and also not reporting it to spam. Neutral behavior means ignoring the phishing email or deleting it without engagement of any kind.

As shown in FIG. 3.2, the computer mouse (330) is a hand-held pointing device that detects motions across a physical surface (e.g., a physical desktop). The computer mouse (330) includes a pointing mechanism coupled to a circuit module that are collectively disposed within a mechanical housing. The pointing mechanism may be based on a mechanical track ball or an optical scanner that detects a sliding motion of the computer mouse (330) across the physical surface. The circuit module generates and transmits a wireless signal corresponding to this detected motion to a computer (320) coupled to a computer display (310). Upon receiving this wireless signal, the motion of the computer mouse (330) is translated into the motion of a cursor (310a) across the computer display (310), which allows a smooth control of the graphical user interface of the computer (320). For example, the cursor (310a) may be moved to an email item (310b) in a list of emails displayed in the Microsoft Windows Environment. The wireless signal may indicate a mouse click on the email item (310b) or mouse hovering over the email item (310b). In this context, the user operating the mouse to click or hover over the email item (310b) is referred to as an email user.

The mouse click and mouse hovering is continuously monitored by a Microsoft Windows Service (126) executing in the background of the Microsoft Windows Environment. For example, the Microsoft Windows Service (126) may be an example of the CSS (120) depicted in FIG. 1. As described in reference to FIG. 1, the CSS (120) analyzes the email item (310b) identified by the mouse click or mouse hovering to generate a phishing indicator detection signal if the email item (310b) is determined to be associated with any phishing attack. In response to determining the email item (310b) as associated with a phishing attack, the phishing indicator detection signal is sent in real time to a signaling mechanism (340b) attached to the computer mouse (330). For example, the signaling mechanism (340b) may be an electromechanical vibrator having a solenoid driving an unbalanced weight from one side to another when activated by the phishing indicator detection signal to generate a mechanical vibration. In another example, the signaling mechanism (340b) may be a buzzer having a voice coil driving a diaphragm when activated by the phishing indicator detection signal to generate an audible sound. The mechanical vibration or audible signal alerts the email user regarding the phishing attack. In one or more embodiments, the signaling mechanism (340b) is attached by the email user to the exterior or interior surface of the computer mouse (330), i.e., the aforementioned housing, via a sticky pad, a Velcro strip, or other strapping mechanism (340). For example, the signaling mechanism (340b) may be laminated or molded in an elastic and dome-shaped film (340a) (e.g., in a rubber material) that is wrapped by the user over the exterior contour of the computer mouse (330), i.e., the aforementioned housing, via an elastic contraction force. In particular, the elastic and dome-shaped film (340a) has an opening (340c) such that one or more buttons (330a, 330b) and a scroll wheel (330c) of the computer mouse (330) are exposed and accessible to the email user's finger. The strapping mechanism (340) with the signaling mechanism (340b) is referred to as an anti-phishing assembly or anti-phishing device. The anti-phishing assembly/device may be obtained by the email user, separately from obtaining the computer mouse (330), to wrap over the computer mouse (330) as a retrofit to the computer mouse (330). The computer mouse (330) retrofitted with the strapping mechanism (340) and the signaling mechanism (340b) is referred to as an anti-phishing mouse, which is an example of the CSH (140) depicted in FIG. 1 above. In an alternative embodiment, the signaling mechanism (340b) is integrated within the computer mouse (330) and is installed on the exterior surface or inside the interior space of the housing during factory assembly of the computer mouse (330).

Embodiments have the following advantages: (i) Increasing phishing awareness by providing tangible warning signs (vibration and audible sound) to alert the user; (ii) Accurate results generated from AI-based software integrated with threat intelligence databases and feeds; and (iii) Capability to retrofit by providing a hardware module that attaches to any mouse that alerts the user using the embedded electromechanical vibrator and/or buzzer in the hardware module.

Figure 4:
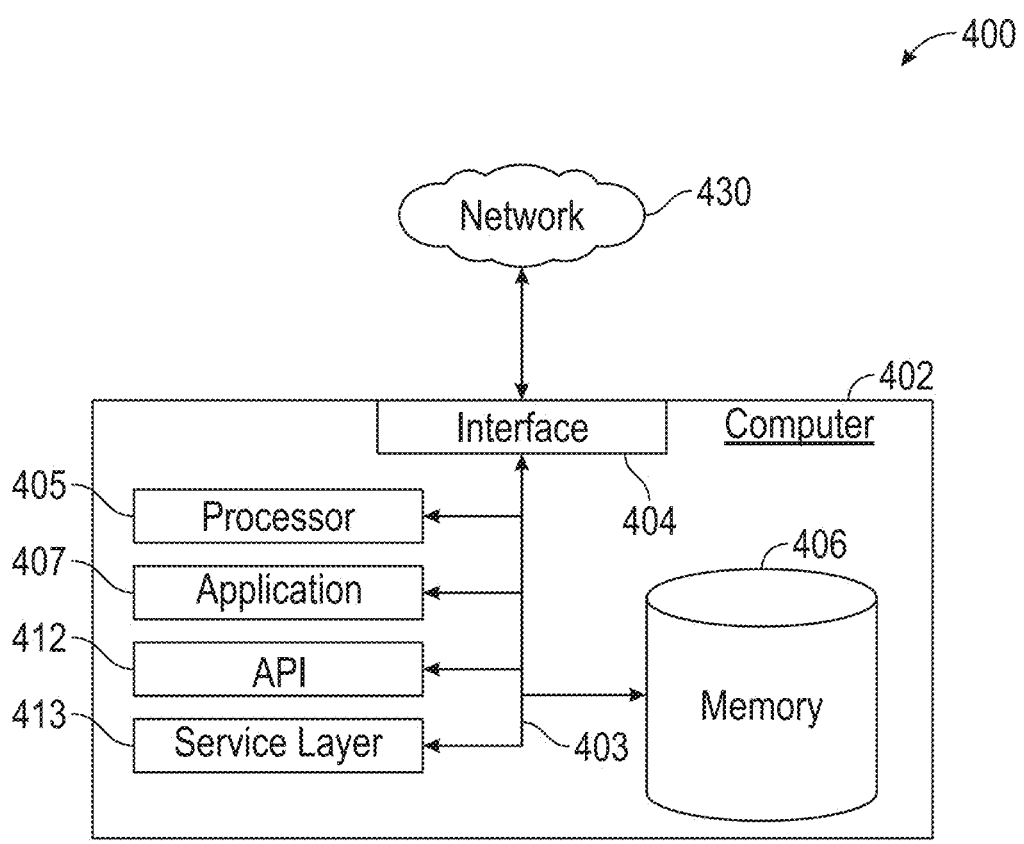
FIG. 4 shows a computing system in accordance with one or more embodiments.

Embodiments may be implemented on a computer system. FIG. 4 is a block diagram of a computer system (402) used to provide computational functionalities associated with described algorithms, methods, functions, processes, flows, and procedures as described in the instant disclosure, according to an implementation. The illustrated computer (402) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or other suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing computer (402), each computer (402) communicating over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

In some embodiments, the computer (402) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112 (f) for any limitations of any of the claims herein, except for those in which the claim expressly uses the words "means for" or "step for" together with an associated function.

What is claimed is:

1. A method to protect an email user against a phishing attack, comprising:
    detecting a mouse click or a mouse hovering, from a computer mouse of the email user, of an email item on a computer desktop;
    determining, based on a threat intelligence data source, that the email item is associated with the phishing attack;
    sending, in response to said determining, a phishing indicator detection signal to a signaling mechanism attached to the computer mouse; and
    generating, by the signaling mechanism in response to the phishing indicator detection signal, an alert signal to the email user, wherein the email user performs a mitigation action in response to the alert signal.

2. The method of claim 1,
wherein the signaling mechanism comprises an electromechanical vibrator, and
wherein the alert signal comprises a mechanical vibration of the computer mouse.

3. The method of claim 1,
wherein the signaling mechanism comprises an acoustic buzzer, and
wherein the alert signal comprises an audible signal.

4. The method of claim 1,
wherein the signaling mechanism is attached to the computer mouse by the email user via a sticky pad or a Velcro strap.

5. The method of claim 1,
wherein the signaling mechanism is attached to the computer mouse by the email user via a dome-shaped elastic wrapper.

6. The method of claim 1,
wherein the signaling mechanism is integrated within the computer mouse without intervention by the email user.

7. The method of claim 1,
wherein the computer desktop corresponds to a Microsoft Windows Environment, and
wherein said determining is by a Microsoft Windows Service analyzing the email item.

8. An anti-phishing mouse to protect an email user against a phishing attack, comprising:
a pointing mechanism that performs a mouse click or a mouse hovering, by the email user, of an email item on a computer desktop, wherein the email item is determined, by an anti-phishing software based on a threat intelligence data source, as being associated with the phishing attack; and
a signaling mechanism coupled to the pointing mechanism,
wherein the signaling mechanism
receives, from the anti-phishing software in response to said determining, a phishing indicator detection signal; and
generates, in response to the phishing indicator detection signal, an alert signal to the email user, and
wherein the email user performs a mitigation action in response to the alert signal.

9. The anti-phishing mouse of claim 8,
wherein the signaling mechanism comprises an electromechanical vibrator, and
wherein the alert signal comprises a mechanical vibration of a housing of the pointing mechanism.

10. The anti-phishing mouse of claim 8,
wherein the signaling mechanism comprises an acoustic buzzer, and
wherein the alert signal comprises an audible signal.

11. The anti-phishing mouse of claim 8, further comprising:
a sticky pad or a Velcro strap,
wherein the signaling mechanism is attached to a housing of the pointing mechanism by the email user via the sticky pad or the Velcro strap.

12. The anti-phishing mouse of claim 8, further comprising:
a dome-shaped elastic wrapper,
wherein the signaling mechanism is attached to a housing of the pointing mechanism by the email user via the dome-shaped elastic wrapper.

13. The anti-phishing mouse of claim 8,
wherein the signaling mechanism is integrated within a housing of the pointing mechanism without intervention by the email user.

14. The anti-phishing mouse of claim 8,
wherein the computer desktop corresponds to a Microsoft Windows Environment,
wherein the anti-phishing software corresponds to a Microsoft Windows Service, and
wherein said determining is by the Microsoft Windows Service analyzing the email item.

15. An anti-phishing system to protect an email user against a phishing attack, comprising:
an anti-phishing mouse comprising:
a pointing mechanism that performs a mouse click or a mouse hovering, by the email user, of an email item on a computer desktop; and
a signaling mechanism coupled to the pointing mechanism; and
an anti-phishing software that
determines, based on a threat intelligence data source, that the email item is associated with the phishing attack; and
sends, in response to said determining, a phishing indicator detection signal to the signaling mechanism of the anti-phishing mouse,
wherein the signaling mechanism generates, in response to the phishing indicator detection signal, an alert signal to the email user, and
wherein the email user performs a mitigation action in response to the alert signal.

16. The anti-phishing system of claim 15,
wherein the signaling mechanism comprises an electromechanical vibrator, and
wherein the alert signal comprises a mechanical vibration of the computer mouse.

17. The anti-phishing system of claim 15,
wherein the signaling mechanism comprises an acoustic buzzer, and
wherein the alert signal comprises an audible signal.

18. The anti-phishing system of claim 15, the anti-phishing mouse further comprising:
a sticky pad, a Velcro strap, or a dome-shaped elastic wrapper,
wherein the signaling mechanism is attached to a housing of the pointing mechanism by the email user via the sticky pad, the Velcro strap, or the dome-shaped elastic wrapper.

19. The anti-phishing system of claim 15,
wherein the signaling mechanism is integrated within a housing of the pointing mechanism without intervention by the email user.

20. The anti-phishing system of claim 15,
wherein the computer desktop corresponds to a Microsoft Windows Environment,
wherein the anti-phishing software corresponds to a Microsoft Windows Service, and
wherein said determining is by the Microsoft Windows Service analyzing the email item.

\* \* \* \* \*